July 11, 1939. W. H. KNIGHT, JR 2,165,387
GAS METER
Filed Oct. 7, 1937
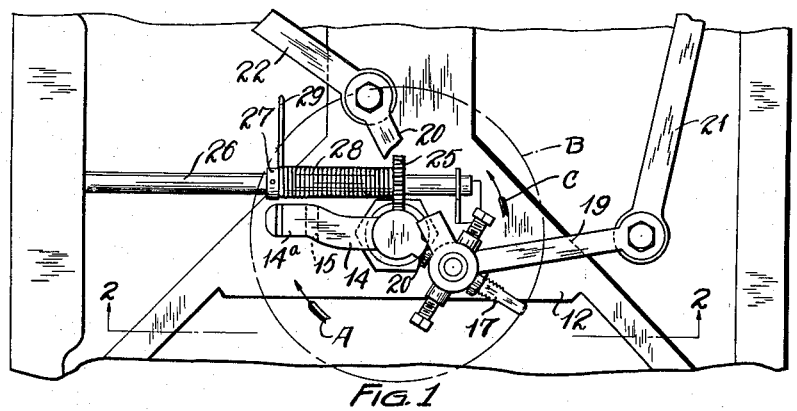
Fig. 1
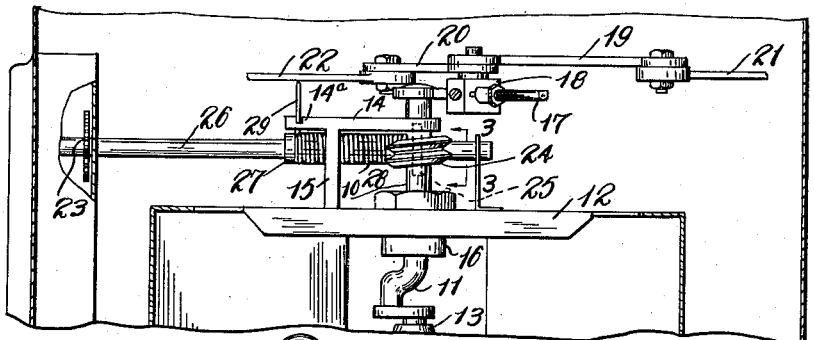
Fig. 2
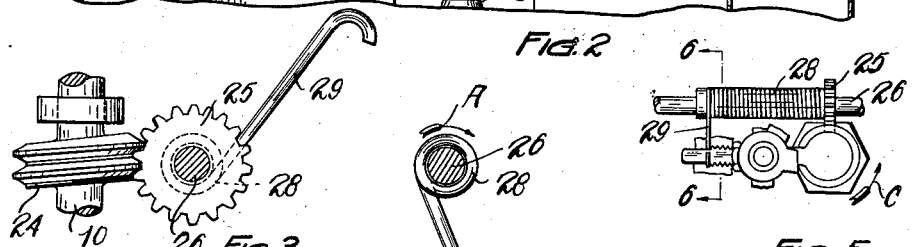
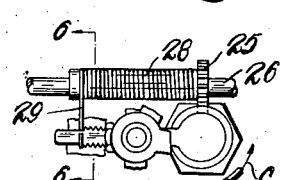
Fig. 5
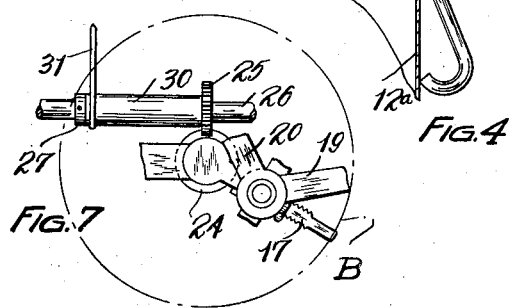
Fig. 4 Fig. 7
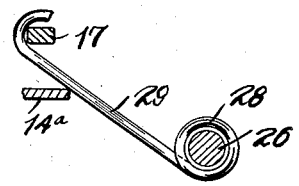
Fig. 6
INVENTOR.
WILLIAM H. KNIGHT JR.
BY
Kwis Hudson & Kent
ATTORNEYS Patented July 11, 1939

2,165,387

UNITED STATES PATENT OFFICE 2,165,387

GAS METER

William H. Knight, Jr., Shaker Heights, Ohio, assignor to The Cleveland Gas Meter Company, Cleveland, Ohio, a corporation of Ohio Application October 7, 1937, Serial No. 167,760

6 Claims. (Cl. 73—275)

This invention relates to gas meters, and particularly to a stop for the tangent arms of the meters.

It is well understood in the art that gas meters of the usual bellows or diaphragm type are susceptible to having their direction of operation reversed by the simple procedure of reversing the inlet and outlet connections of the meters. This reversing of the direction of operation of the meters naturally would result in reversing the operative direction of the registering or indicating mechanisms associated with the meters. Therefore it has been customary to provide means for stopping the reverse operation of gas meters and the practice usually followed has been to provide in the meters pivoted stop pawls which when engaged by the circularly swinging tangent arms during normal operation of the meters merely rock about their pivots to an inoperative position, but which when they are engaged by the moving tangent arms upon reverse operation of the meters act as stop abutments to prevent further movement of the tangent arms in the reverse direction. The return of the stop pawls to normal position after having been rocked to inoperative position during each revolution of the tangent arms when the meters are operating normally is accompanied by a relatively loud click. Inasmuch as it is now quite common to utilize the basements of homes for recreation purposes, it has become desirable to eliminate noises from gas meters, and since the constant click produced by the tangent arm stop pawls is the most objectionable noise emanating from gas meters, the principal object of the present invention is to provide in gas meters stop means for the tangent arms which are silent during the normal operation of the meters.

It is essential that the stop means for the tangent arms of gas meters be so constructed as to permit a limited reverse operation of the meters in case the meters should be subjected to excessive back pressures on the outlet sides thereof in order that the meter mechanisms will not be strained or broken.

Another object of the present invention is to provide in gas meters means for preventing excessive reverse operation of the meters but allowing a limited reverse operation thereof sufficient to take care of and relieve back pressure in the meters.

A further object of the invention is to provide in gas meters means for preventing excessive reverse operation thereof and which means is quiet during normal operation of the meters, is exceedingly simple in construction, consists of a minimum number of inexpensive parts, is efficient and can be readily applied to existing types of gas meters, without requiring any substantial changes in their construction.

Further and additional objects and advantages not hereinbefore referred to will become apparent hereinafter during the following detailed description of two embodiments of the invention which are illustrated in the accompanying drawing wherein:

Fig. 1 is a fragmentary top plan view of a gas meter with the meter top or cover removed.

Fig. 2 is a vertical sectional view taken substantially on line 2—2 of Fig. 1 looking in the direction of the arrows.

Fig. 3 is a detached fragmentary view partly in section and partly in elevation and is taken substantially on line 3—3 of Fig. 2, looking in the direction of the arrows, and shows the vertical meter spindle carrying the worm which meshes with the worm wheel on the horizontal register mechanism shaft that carries the stop for the tangent arm.

Fig. 4 is a detached fragmentary view partly in section and partly in elevation and shows the stop for the tangent arm carried by the horizontal register mechanism shaft in inoperative position and abutting a part of the meter casing.

Fig. 5 is a detached fragmentary top plan view of the tangent arm and the stop means therefor with the latter shown in the operative position and engaged by the tangent arm.

Fig. 6 is a detached fragmentary sectional view taken substantially on line 6—6 of Fig. 5 looking in the direction of the arrows, and Fig. 7 is a detached fragmentary top plan view similar to Fig. 5 but shows a modified form of tangent arm stop means and further illustrates said stop means in the inoperative position.

The invention is shown herein as applied to a gas meter of conventional construction and which has the usual vertically extending spindle 10 provided adjacent its lower end with a crank portion 11 that is operatively connected to the valve arms of the valves (not shown) which control the flow of gas to and from the measuring bellows or diaphragms. The spindle 10 extends through the usual plate 12 of the meter casing and is rotatably supported at its lower end in a bearing 13 while adjacent its upper end it is rotatably supported in a bearing formed in the arm 14 of a bracket 15 that is secured to the plate 12. The spindle 10 is also rotatably supported where it passes through the plate 12 by a suitable stuffing box 16 carried by the plate. The spindle 10 has fixed to its upper end the usual tangent arm 17 which carries an adjustable block 18 that is pivotally connected to links 19 and 20 in turn pivotally connected, respectively, to flag wires or arms 21 and 22. The flag wires or arms 21 and 22 are actuated by the bellows or diaphragms (not shown) and, in turn, through the links 19 and 20 move the tangent arm in a circular path, thus effecting rotation of the spindle 10 and an actuation of the meter valves, as is well understood in the art.

In the normal operation of the meter the tangent arm is moved in a circular path and the spindle 10 is correspondingly rotated in a clockwise direction as indicated by the arrow A in Fig. 1. The meter registering or dial mechanism indicated at 23 is actuated by the spindle 10 through the medium of a worm 24 fixed on the spindle and meshing with a worm wheel 25 fixed to a rotatable horizontally extending shaft 26 that extends into and is operatively connected with the registering mechanism. The meter construction just described is conventional and will be fully understood by those skilled in the art.

As previously stated, it is necessary in gas meters to provide means for preventing the reverse operation of the meters when the inlet and outlet connections are reversed. Such means, however, should be so constructed as to allow a limited reverse movement of the meter mechanisms to compensate for excessive back pressures which might occur on the outlet sides of the meters.

In view of the increasing use of the basements of homes for recreational purposes, it is desirable that the stop means do not make any noise during the normal operation of the meters. The present invention relates to stop means of this character and which possesses the characteristics of simplicity of construction and application to the meter mechanism, quietness during the normal operation of the meters and is of such design as to permit a limited reverse operation of the meters but prohibits excessive reverse operation thereof. One form of stop means for the purposes specified and embodying the invention will now be described.

It is proposed to mount on the horizontal registering mechanism shaft 26 between the worm wheel 25 and a collar 27 fixed to the shaft a closely wound coil spring 28 having its last coil adjacent to the collar 27 extending into an elongated hook 29. The coil spring 28 has an internal diameter such that the spring and shaft can rotate relative to each other, but the length of the spring and the weight thereof are such that the spring will have sufficient frictional contact with the shaft 26 so that it will rotate with said shaft unless the extended hook 29 of the spring is in engagement with a fixed abutment, at which latter time the shaft 26 will rotate within the coil spring. When the meter is operating in the normal direction, i. e., in the direction of the arrow A, the outer end of the tangent arm 17 travels in a circular path indicated by the dash and dot circle B of Fig. 1. Of course, at this time the spindle 10 is rotating in a clockwise direction and is driving through the worm 24 and worm wheel 25 the shaft 26 in a clockwise direction. The clockwise rotation of the shaft 26 causes the coil spring 28 to rotate with the shaft until the extended hook 29 of the spring comes into abutting engagement with the vertically extending portion 12a of the plate 12, after which the shaft 26 rotates freely within the coil spring 28. At this time it is evident that the hook 29 lies without the path of the swinging tangent arm.

Assuming that the operation of the meter is reversed, the tangent arm 17 will move in a circular path in the direction of the arrow C in Figs. 1 and 5, with the result that the spindle 10 and the shaft 26 will rotate in an anti-clockwise direction. The anti-clockwise rotation of the shaft 26 will cause the coil spring 28 to rotate with the shaft due to its frictional contact therewith and this rotation of the coil spring 28 with the shaft 26 in the anti-clockwise direction will move the hook 29 of the spring from the position shown in Fig. 4 through the position shown in Fig. 3 until it is substantially in a vertical position, at which time the upper end of the hook will lie within the orbital path B of the outer end of the tangent arm 17 and said arm in its travel will contact with the extension 29 adjacent the hook thereof and the further movement of the tangent arm in the anti-clockwise direction will rock the extension 29 and the spring 28 relative to the shaft 26 until the extension 29 comes into engagement with the portion 14a of the bracket 15 as shown in Figs. 5 and 6, and at which time the tangent arm 17 lies within the hook of the extension 29 and further rotation of the arm in a reverse direction is prohibited.

It will be noted that due to the drive between the spindle 10 and the shaft 26 the rotation of the spindle and the anti-clockwise movement of the tangent arm do not bring the hooked extension 29 of the spring into position to be engaged by the tangent arm 17 until after said arm has made a number of complete turns in the reverse direction, wherefore in case excessive back pressures occur on the outlet side of the meter, the meter can have a limited operation in the reverse direction so as to relieve such back pressures and thus avoid strain or breakage of the meter mechanism.

Assuming that the tangent arm 17 has been stopped by the hooked extension 29 and the parts are in the position indicated in Fig. 6, the operation of the meter in the normal direction, that is in the direction of arrow A, will cause the tangent arm to move away from the hooked extension 29 and as said arm swings the spring 28 will rotate in a clockwise direction with the shaft 26. However, the rotation of the spring 28 with the shaft 26 will not be sufficiently great to move the hook extension 29 out of the path of the swinging tangent arm as the latter completes its first revolution, with the result that the arm contacts with the hooked extension 29 and imparts thereto and to the spring 28 a limited clockwise rotation relative to the shaft 26, it being understood, of course, that this contact between the tangent arm and the hooked extension in no way affects the movement of the tangent arm in the clockwise or normal direction. The continued operation of the meter in the normal direction causes the spring 28 to rotate with the shaft 26 due to the frictional contact therebetween until the hooked extension 29 again engages with the portion 12a of the plate 12, after which, as previously explained, the shaft 26 rotates independently of the spring 28.

In Fig. 7 there is illustrated a slightly modified form of the invention, in that instead of using a coil spring 28 there is employed an elongated tubular sleeve 30 mounted on the shaft 26 between the worm wheel 25 and the collar 27. The sleeve 30 can rotate independently of the shaft 26, but is of such length and weight as to provide sufficient frictional contact with the shaft 26 to cause the sleeve to rotate therewith as a unit until the sleeve's rotation is positively stopped, as, for example, when the hooked arm 31 corresponding to the hooked extension 29 and which is secured to the sleeve 30 adjacent the collar 27 engages with the portion 12a of the plate or with the portion 14a of the bracket 15. The manner in which the form shown in Fig. 7 functions and operates is identical with the form previously described.

From the foregoing description it will be seen that the invention embraces means for stopping the excessive reverse operation of the meter, and which since it simply consists of an elongated tubular member mounted on the shaft 26 between the worm wheel 25 and the collar 27 and is provided with an extended hook, can be readily applied to existing meter constructions without necessitating any alterations therein. Further, since the stop means only includes two simple and inexpensive elements, namely, the elongated tubular member that is mounted on the shaft and the collar 27, it can be employed in gas meters without affecting in any substantial way the cost thereof.

In view of the explanation hereinbefore set forth it will be clear that during the normal operation of the meter the stop means is not in a position to be contacted by the swinging tangent arm and hence no click or noise occurs as has been the case in meters employing the usual tangent arm stop pawl that is engaged by the tangent arm with each revolution thereof during the normal operation of the meter. It will also have been noted that the tangent arm upon the reverse operation of the meter can swing through a number of complete turns before the stop means is brought into operative position, wherefore ample provision is made for allowing a limited reverse operation of the meter to relieve excessive back pressures.

Although two embodiments of the invention have been illustrated herein, it will be understood that the invention is susceptible of various modifications and adaptations within the scope of the appended claims.

Having thus described my invention I claim:

1. In a gas meter having a swinging tangent arm, a spindle actuated by said arm and a registering mechanism shaft actuated by said spindle; a stop for preventing movement of said tangent arm in a reverse direction carried by said shaft and during normal operation of the meter moved by said shaft in a plane perpendicular thereto to a position without the path of said arm while upon reverse operation of the meter it is moved by said shaft in the same plane to a position within the path of said arm.

2. In a gas meter having a swinging tangent arm, a spindle actuated by said arm and a registering mechanism shaft actuated by said spindle; means for preventing movement of said tangent arm in a reverse direction comprising a member mounted on said shaft and capable of movement around the shaft in a plane perpendicular thereto but so designed as to provide sufficient frictional contact therewith that it will rotate in unison with said shaft, an elongated hook carried by said member, and spaced abutments engageable by said hook to limit the rotation of said member with said shaft, said hook when in engagement with one of said abutments lying in the path of said tangent arm and when in engagement with the other of said abutments lying without the path of said arm.

3. In a gas meter having a swinging tangent arm, a spindle actuated by said arm, and a registering mechanism shaft actuated by said spindle; means for preventing movement of said tangent arm in a reverse direction comprising a tubular member mounted on said shaft and capable of movement relative thereto but of such length and weight as to provide sufficient frictional contact therewith that it will rotate in unison with said shaft, an elongated hook carried by said member, means for preventing movement of said member axially of said shaft, and spaced abutments engageable by said hook to limit the rotation of said member with said shaft, said hook when in engagement with one of said abutments lying in the path of the swinging tangent arm and when in engagement with the other of said abutments lying without the path thereof.

4. In a gas meter having a swinging tangent arm, a spindle actuated by said arm, and a registering mechanism shaft actuated by said spindle; means for preventing movement of said tangent arm in a reverse direction comprising a coil spring mounted on said shaft and capable of movement relative thereto but of such length and weight as to provide sufficient frictional contact therewith that it will rotate in unison with said shaft, means for preventing movement of the coil spring axially of said shaft, said coil spring being provided at one of its ends with an extended hook portion, and spaced abutments engageable by said hook portion to limit the rotation of said spring with said shaft, said hook portion lying in the path of the swinging movement of said tangent arm when in engagement with one of said abutments and lying without the path thereof when in engagement with the other of said abutments.

5. In combination in a gas meter a swinging tangent arm, a spindle actuated by said arm and provided with a worm, a registering mechanism shaft having a worm wheel meshing with said worm and provided with a collar spaced from said worm wheel and fixed to said shaft, and means for preventing movement of said tangent arm in a reverse direction comprising a tubular member mounted on said shaft filling the space between said worm wheel and said collar and capable of rotative movement relative thereto but having sufficient frictional contact with said shaft as to rotate in unison therewith, an elongated hook carried by said member, and spaced abutments engageable by said hook to limit the rotation of said member with said shaft, said hook when in engagement with one of said abutments lying in the path of movement of said tangent arm and when in engagement with the other of said abutments lying without the path thereof.

6. In combination in a gas meter a swinging tangent arm, a spindle actuated by said arm and provided with a worm, a registering mechanism shaft provided with a worm wheel meshing with said worm and having fixed thereon a collar spaced from said worm wheel, and means for preventing movement of said tangent arm in a reverse direction comprising a coil spring mounted on said shaft intermediate said collar and said worm wheel and capable of rotative movement only relative to said shaft but having sufficient frictional contact therewith as to cause it to rotate in unison with said shaft, said spring being provided with an elongated hook portion, and spaced abutments engageable by said hook portion to limit the rotation of said spring in unison with said shaft, said hook portion when in engagement with one of said abutments lying in the path of the swinging tangent arm and when in engagement with the other of said abutments lying without the path thereof.

WILLIAM H. KNIGHT, JR.